Patented Nov. 11, 1952

2,617,798

UNITED STATES PATENT OFFICE 2,617,798

AZO DYESTUFFS

Willy Mueller and Max Schmid, Riehen, Switzerland, assignors to Ciba Limited, Basel, Switzerland, a Swiss firm No Drawing. Application February 6, 1950, Serial No. 142,708. In Switzerland February 25, 1949

9 Claims. (Cl. 260—193)

It is known that many vat dyestuffs can be converted into so-called leuco ester salts. The representatives of this group preferably employed in practice contain per dyestuff molecule 2 or more groupings of the formula O—SO₃—Me wherein Me indicates for example ammonium, sodium or another alkali metal. These leuco ester salts are as a rule water-soluble on account of the presence of the —SO₃—Me group and are very stable in neutral to alkaline medium. They can be employed according to special dyeing and printing processes worked out for this group of dyestuffs and in which finally the vat dyestuff on which they are based is regenerated on the fiber.

A few dyestuffs have also already been prepared which contain a leuco-anthraquinone sulfuric acid ester radical and also an azo group attached directly to an anthraquinone radical. In the case of the dyestuffs of this type however the anthraquinone component was employed as diazo component and the selection of the diazotization components which are concerned is naturally limited.

The present invention is based on the observation that valuable new azo dyestuffs are obtained when as coupling component an arylide of a β-keto carboxylic acid is employed which contains in the molecule the atom grouping of a leuco-sulfuric acid ester of the anthraquinone series and in which a bond exists between the amide nitrogen atom and an anthraquinone carbon atom in β-position.

By the expression "a bond between the amide nitrogen atom and an anthraquinone carbon atom in β-position" is to be understood for example a direct bond or a bond by way of a bridge member attached in β-position (see below).

The coupling components to be employed according to the present process can be produced by reacting a leuco ester of an anthraquinone compound which contains at least one amino group attached directly or through a bridge member with an anthraquinone carbon atom in β-position, with such an acylating agent as is capable of introducing the radical of a β-keto carboxylic acid. As is known the anthraquinone leuco esters generally exist in the form of their alkali salts. They are not very stable in strong acid media, particularly at elevated temperature.

As leuco ester salts of anthraquinones which contain at least one amino group there are concerned for example the leuco ester salts of aminoanthraquinones which contain an amino group attached directly to a carbon atom in β-position of the anthraquinone nucleus. As examples may be mentioned the leuco ester salts of 2-aminoanthraquinone, of 3-halogeno- for example 3-bromo- or especially 3-chloro-2-aminoanthraquinone and also of 2:6-diaminoanthraquinone. Such products can also be employed as contain the amino group in a radical, for example a benzene radical, attached to a carbon atom in β-position of the anthraquinone nucleus by way of a direct C-C-bond or by way of a bridge member. As bridge members are concerned for example the azo group, the carboxylic acid amide group or one of the groupings $$-SO_2-, \quad -NHCONH-, \quad -SO_2-\overset{CH_3}{\underset{|}{N}}- \quad \text{and} \quad -\overset{CH_3}{\underset{|}{N}}-SO_2-$$

As examples may be mentioned the leuco ester salts of 3-chloro-2-(p-aminobenzoyl)-aminoanthraquinone, of 1-(p-aminobenzoyl)-aminoanthraquinone, and also products of the general formula

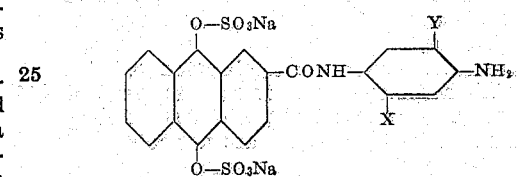

in which X and Y indicate hydrogen, alkyl, alkoxy or halogen as for example

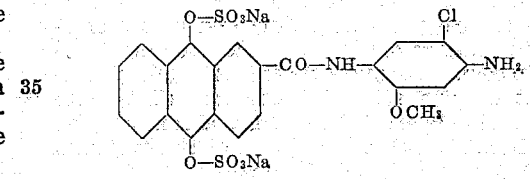

and the product of the formula

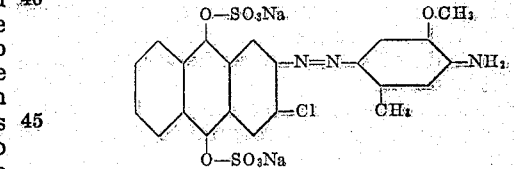

The said compounds containing an amino group can be treated with any suitable acylating agents which are capable of introducing the radical of a keto carboxylic acid. In a simple and satisfactory manner there can be employed for this treatment diketene, which is known to be capable of introducing an aceto-acetyl radical. The reaction can suitably be carried out in an aqueous medium, if desired with addition of catalysts. In the case of the application of diketene the reaction in general proceeds easily even at room temperature or at the most slightly elevated temperature.

The acetoacetic arylides thus obtainable may be converted by reaction with acid halides (other than acetic acid halides) as for example acid halides containing at the most 13 carbon atoms, such as furane carboxylic acid halides. There may be used preferably aromatic acid halides of the benzene series such as diphenyl carboxylic acid halides, -p-chloro-benzoyl-chloride or especially benzoyl chloride. The so-obtained β-keto carboxylic acid arylides, for example the aroyl-acetic acid arylides are likewise suitable as coupling components. The coupling components of the present process are, on account of the presence of the leuco ester grouping, water soluble and, on account of the presence of the β-keto carboxylic acid grouping, capable of coupling.

The diazo compounds with which the arylides of the β-keto carboxylic acids are coupled can for example contain sulfonic acid groups. Preferably however there are employed as diazo compounds such as are suitable for example for the manufacture of so-called ice-colors and contain no solubilizing group and especially no carboxylic acid or sulfonic acid group. As examples may be mentioned 2-nitro-4-methyl-1-aminobenzene, 4-chloro-2-nitro-1-aminobenzene, 5-chloro-2-methoxy-1-aminobenzene, 4-chloro-2-methyl-1-aminobenzene, 2-chloro-1-aminobenzene, 2-nitro-1-aminobenzene, 2-nitro-4-methoxy-1-amino benzene, 2-methyl-4-chloro-2-methoxy-1-aminobenzene and 2:6-dimethyl-1-aminobenzene.

Diazoazo compounds are also concerned as for example the diazo compound from 4-amino-2:5:2'-trimethoxy-1:1'-azobenzene. Diazo compounds containing sulfonic acid groups, as for example diazotized 1-amino-2-methoxybenzene-5-sulfonic acid, are employed with advantage in those cases in which the application of diazo compounds without solubilizing groups leads to the formation of dyestuffs which in spite of the two sulfuric acid ester groups are not sufficiently soluble. This is for example the case with diazo dyestuffs from the leuco sulfuric acid ester of 2:6-diacetoacetylamino-anthraquinone; this compound contains two keto methylene groups which are capable of coupling and it is preferable, in order to obtain sufficiently soluble products, to couple one molecule of this coupling component on one side with one mol of a diazo compound free from solubilizing groups and on the other side with one mol of a diazo compound containing sulfonic acid groups.

In the present process the coupling can be carried out in the customary manner for example in a weakly alkaline aqueous medium containing sodium carbonate at temperatures between 0° C. and about 20–25° C.

The dyestuffs obtainable according to the present process are new and correspond to the general formula $$R_1-N=N-R_2$$

in which $R_1$ indicates the radical of a diazo component and $R_2$ the radical of an arylide of a β-keto carboxylic acid which is attached to the azo group by the carbon atom adjacent to the functionally converted carboxyl group of the β-keto carboxylic acid, which contains the atom grouping of a leuco sulfuric acid ester of the anthra- quinone series, and in which in addition a bond exists between the amide nitrogen atom and an anthraquinone carbon atom in β-position.

The radical of the coupling components is set out below in the keto form but it is not to be understood that this indicates that the products concerned are incapable of also existing in the enol form.

These dyestuffs are suitable for the dyeing and printing of fibers of very varied nature, as for example animal fibers such as wool and silk and especially vegetable fibers such as cotton, artificial silk and also staple fiber from regenerated cellulose. The same dyeing and printing processes can be employed as are generally known for leuco ester salts and which depend in principle upon the fact that the soluble leuco ester salt is reconverted by simultaneous saponification and oxidation into the water-insoluble dyestuff which contains instead of a vatted radical the unvatted water-insoluble residue, for example an anthraquinone radical.

The following examples illustrate the invention, the parts and percentages being by weight:

*Example 1*

Into a solution of 51.3 parts of the disodium salt of the leuco sulfuric acid ester of 2-acetoacetylamino-anthraquinone and 25 parts of sodium carbonate in 250 parts of water there is allowed to flow at 5–8° C. within 10 minutes a diazo solution which has been obtained by diazotization of 18.75 parts of 1-amino-4-chloro-2:5-dimethoxybenzene in 200 parts of water. The whole is stirred for 2 hours at 5–8° C. and then for 6 hours at 10–15° C. The dyestuff formed for the most part separates as a yellow crystallized precipitate. The whole is now heated to 30–40° C., whereby the dyestuff passes into solution, treated with 40 parts of sodium chloride and stirred to complete separation of the dyestuff. Filtration is then carried out and the dyestuff washed with 10 per cent sodium chloride solution and dried in vacuum at 50–60° C. The dyestuff is obtained in the form of a yellow powder which is easily soluble in water with a yellow color. Printed on cotton there are obtained after development with sodium nitrite and dilute sulfuric acid pure yellow shades of excellent wet fastness properties and fastness to chlorine and very good fastness to light.

The new dyestuff has the following constitution:

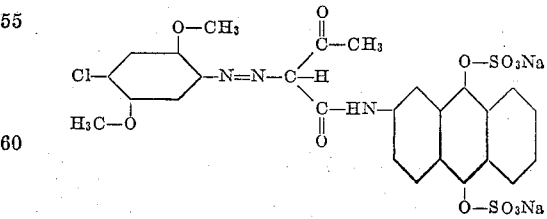

The disodium salt of the leuco sulfuric acid ester of 2-acetoacetylaminoanthraquinone can be produced in the following manner:

30 parts of chlorsulfonic acid are added drop by drop with good cooling and stirring to 150 parts of pure dry pyridine and into the mixture obtained 26.5 parts of 2-acetylaminoanthraquinone and 12 parts of iron powder introduced. The mixture is heated during 4–6 hours to 50° C. and then poured into a solution of 50 parts of sodium carbonate in 1000 parts of water. The pyridine is removed by distillation under reduced pressure and the remaining solution filtered from iron sludge. From the filtrate on addition of 150 parts of sodium chloride is precipitated the disodium salt of the leuco sulfuric acid ester of 2-acetylaminoanthraquinone as a pale yellow crystal paste. The product is filtered with suction and washed with 20 per cent. sodium chloride solution.

The filter cake thus obtained is stirred with 50 parts of water and heated for 15 minutes to 80–90° C. with 50 parts of 30 per cent. caustic soda solution. After a short time the disodium salt of the leuco sulfuric acid ester of 2-aminoanthraquinone precipitates as a thick yellow crystal paste. This is allowed to cool and then diluted with an equal volume of alcohol, filtered and the residue washed with alcohol until no further excess alkali can be detected in the filtrate. The disodium salt dissolves very easily in water with a strong yellow green fluorescence.

42.9 parts of the disodium salt of the leuco sulfuric acid ester of 2-aminoanthraquinone are dissolved in 150 parts of water and the solution if necessary neutralized with a few drops of 10 per cent. acetic acid. To this solution are added drop by drop at 5–10° C., 8.5 parts of diketene and the whole is stirred for about 10 hours at 5–10° C. After this time the disodium salt of the leuco sulfuric acid ester of 2-acetoacetylaminoanthraquinone has separated in crystalline form and is filtered off and if desired dried.

*Example 2*

18.75 parts of 1-amino-4-chloro-2:5-dimethoxybenzene are diazotized with 25 parts of 30 per cent. hydrochloric acid and 25 parts of 4N-sodium nitrite solution in 800 parts of water at 5–7° C. The clear diazo solution is allowed to flow at 0–5° C. into a solution of 54.7 parts of the disodium salt of the leuco sulfuric acid ester of 3-chloro-2-acetoacetylamino-anthraquinone and 30 parts of sodium carbonate in 200 parts of water. From the yellow solution the dyestuff separates after a short time as a yellow crystal paste. The whole is stirred for 2 hours at 0–5° C. and then for 6 hours at 10–15° C. Then heating is effected to 40–45° C. whereby the dyestuff passes into solution, 40 parts of sodium chloride are introduced and stirring at room temperature then carried out until separation of the dyestuff is complete. The product is filtered, washed with 10 per cent. sodium chloride solution and dried in vacuum at 50–60° C. The dyestuff is obtained in the form of a yellow powder which is easily soluble in water with a yellow color. Printed on cotton there are obtained after development with sodium nitrite and dilute sulfuric acid pure powerful yellow shades of very good fastness to chlorine and light and very good wet fastness properties.

The new dyestuff corresponds to the formula

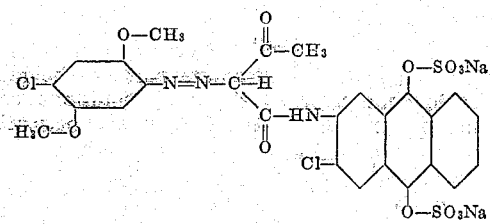

A valuable dyestuff can be prepared in the above manner if the disodium salt of the leuco sulfuric acid ester of 3-chloro-2-acetoacetylaminoanthraquinone is replaced by the disodium salt of the leuco sulfuric acid ester of 3-bromo-2-acetoacetylaminoanthraquinone.

The disodium salt of the leuco sulfuric acid ester of 3 - chloro - 2 - acetoacetylaminoanthraquinone is obtained by condensation of the leuco sulfuric acid ester of 3-chloro-2-aminoanthraquinone with diketene in neutral aqueous solution.

If there are employed in the above example, instead of the 1-amino-4-chloro-2:5-dimethoxybenzene, 12.5 parts of 1-amino-2-methoxybenzene, a dyestuff is obtained which in cotton printing after development with acid oxidizing agents gives somewhat more greenish pure yellow shades of equally good fastness properties.

*Example 3*

10.7 parts of 1-amino-4-methylbenzene are diazotized in the customary manner and the diazo solution allowed to flow at 5–8° C. into a solution of 54.7 parts of the disodium salt of the leuco sulfuric acid ester of 3-chloro-2-acetoacetylaminoanthraquinone and 30 parts of sodium carbonate in 250 parts of water. The whole is stirred for 2 hours at 5–10° C. and 6 hours at 10–15° C. Heating is then effected to 40–45° C., 50 parts of sodium chloride added and stirring carried out at room temperature to complete separation of the dyestuff. This is filtered with suction, washed with dilute sodium chloride solution and dried in vacuum at 50–60° C. A yellow powder is obtained which is easily soluble in water and which when printed on cotton and developed with acid oxidizing agents gives pure powerful yellow shades of very good fastness properties.

By replacing in this example the 1-amino-4-methylbenzene by an equivalent quantity of 1-amino-2:4-dimethoxy-5-chlorobenzene, there is obtained a dyestuff which when printed on cotton and developed with acid oxidizing agents yields powerful gold-orange shades of very good fastness properties.

*Example 4*

Into a solution of 61.2 parts of the disodium salt of the leuco sulfuric acid ester of 2:6-diacetoacetyl-aminoanthraquinone and 50 parts of sodium carbonate in 500 parts of water, there is allowed to flow with stirring at 5–8° C. a diazo solution produced in known manner from 12.3 parts of 1-amino-2-methoxybenzene. The whole is stirred for 2 hours at 5–8° C. whereby the diazo compound completely disappears. The monoazo dyestuff separates for the most part in this operation. Then with further cooling to 5–8° C., a diazo solution from 10.3 parts of 1-amino-2-methoxybenzene-5-sulfonic acid in 200 parts of water is allowed to flow in. The diazo compound disappears rapidly with solution of the monoazo dyestuff and with formation of a thick jelly mass. The whole is stirred for 12 hours at room temperature and then slowly heated to 50–55° C. whereby a clear solution is obtained. 100 parts of sodium chloride are introduced and stirring carried out at room temperature to complete separation of the dyestuff. This is filtered with suction, washed with dilute sodium chloride solution and the dyestuff obtained dried in vacuum at 50–60° C. There is obtained a yellow brown dyestuff powder which dissolves in water with an orange color and when printed on cotton gives after development with acid oxidizing agents yellow shades.

The dyestuff corresponds to the following formula

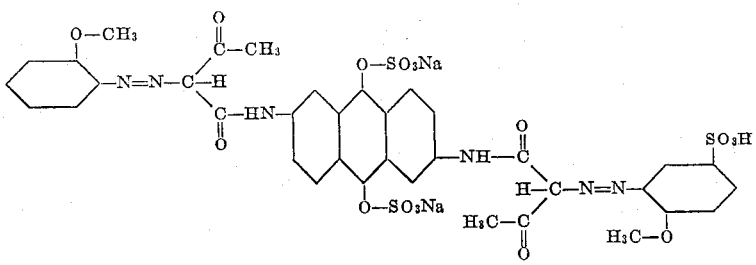

The disodium salt of the leuco sulfuric acid ester of 2:6-diacetoacetylaminoanthraquinone is obtained by esterification of 2:6-diacetylaminoanthraquinone in a mixture of pyridine and chlorsulfonic acid with the addition of iron powder, saponification of the diacetyl derivatives in 10 per cent. potassium hydroxide solution and condensation of the leuco sulfuric acid ester of 2:6-diaminoanthraquinone with diketene in neutral aqueous solution.

*Example 5*

54.8 parts of the disodium salt of the leuco sulfuric acid ester of 2-(4'-aminobenzoylamino)-anthraquinone of the formula

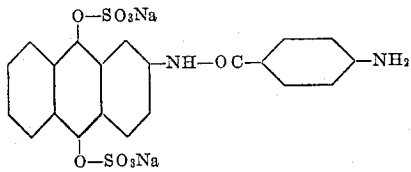

(obtained by condensation of the leuco sulfuric acid ester of 2-aminoanthraquinone with p-nitrobenzoyl chloride and reduction of the nitro group with sodium sulfide) are dissolved in 500 parts of water and to this solution at 5–10° C., 8.4 parts of diketene added drop by drop. The whole is stirred at 5–10° C. until no more free amine can be detected in the solution and the condensation product is precipitated by addition of 80 parts of potassium chloride. It is filtered with suction and washed with dilute potassium chloride solution.

The quantity of the moist condensation product corresponding to 31.6 parts of dry substance is dissolved in 500 parts of water with 15 parts of sodium carbonate, the solution cooled at 0° C. and into it allowed to flow within 30 minutes a diazo solution obtained by diazotization of 9.4 parts of 1-amino-4-chloro-2:5-dimethoxybenzene in 150 parts of water. The whole is stirred for 2 hours at 5–8° C. and 6–8 hours at 10–15° C. The dyestuff formed separates almost completely. 50 parts of sodium chloride are added and stirring effected to complete separation of the dyestuff which is filtered and washed with dilute sodium chloride solution. After drying in vacuum at 60–70° C., the dyestuff is obtained as a red-brown powder which dissolves in water with an orange color and when printed on cotton after development with acid oxidizing agents gives reddish-yellow shades of good fastness to boiling and chlorine.

By replacing in this example the 4-chloro-1-amino-2:5-dimethoxybenzene by 2-nitro-4-methylaniline, a dyestuff is obtained which when printed on cotton after development with acid oxidizing agents gives pure greenish-yellow shades.

*Example 6*

57.8 parts of the disodium salt of the leuco sulfuric acid ester of 1-(3'-amino-4-methoxybenzoyl)-aminoanthraquinone of the formula

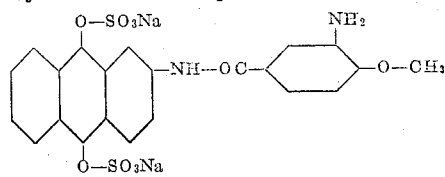

(obtained by condensation of the leuco sulfuric acid ester of 2-aminoanthraquinone with 3-nitro-4-methoxybenzoyl chloride and reduction of the nitro group with sodium sulfide), are dissolved in 800 parts of water and at 5–8° C. with good stirring 8.4 parts of diketene added drop by drop. The whole is stirred for 12 hours at 5–10° C. whereby the condensation product for the most part separates in the form of yellow crystals. 100 parts of potassium chloride are added, stirring is continued for a further 30 minutes and the product is filtered and washed with dilute potassium chloride solution.

The quantity of the moist condensation product corresponding to 33.1 parts of dry substance is dissolved in 500 parts of water with 15 parts of sodium carbonate, the solution cooled to 5° C. and to it within 30 minutes a diazo solution added obtained by diazotization of 9.4 parts of 4-chloro-1-amino-2:5-dimethoxy benzene in 200 parts of water. The whole is stirred for 2 hours at 5–10° C. and 6 hours at 10–15° C. The dyestuff thereby separates completely. It is filtered with suction, washed with a little dilute sodium chloride solution and dried in vacuum at 60–70° C. There is obtained in this manner a yellow-brown dyestuff powder which dissolves in water with an orange color and which when printed on cotton after development with acid oxidizing agents gives pure gold-orange shades of good fastness properties.

By replacing in the above Example the 4-chloro-1-amino-2:5-dimethoxy benzene by 1-amino-2-methoxy benzene a dyestuff is obtained which when printed on cotton after development with acid oxidizing agents gives pure reddish-yellow shades.

*Example 7*

57.8 parts of the disodium salt of the leuco sulfuric acid ester of the anthraquinone condensation product of the following constitution

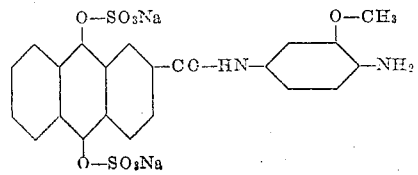

(obtained by condensation of anthraquinone-3-carboxylic acid chloride with 1-formylamino-2-methoxy-4-amino-benzene, esterification of the condensation product obtained with chlorosulfonic acid in pyridine with the addition of iron and saponification of the formyl amino group with 10 per cent caustic potash solution) are dissolved in 500 parts of water and with stirring at 5–8° C., 8.4 parts of diketene added drop by drop. The whole is stirred for 12 hours at 5–10° C. Then the solution is treated with 25 parts of sodium carbonate and with cooling to 5° C., a diazo solution obtained by diazotization of 18.7 parts of 4-chloro - 1 - amino-2:5-dimethoxybenzene allowed to flow in. The dyestuff formed separates after a short time as a thick yellow-brown precipitate. Stirring is carried out for 8 hours at 8–10° C. and the product is filtered and washed with dilute sodium chloride solution. After drying in vacuum at 50–60° C., the dyestuff is obtained as a brown powder which easily dissolves in water with an orange color. When printed on cotton there are obtained after development with acid oxidizing agents yellow-orange shades of good fastness properties.

Example 8

46.35 parts of the disodium salt of the leuco sulfuric acid ester of 3-chloro-2-aminoanthraquinone are dissolved in 200 parts of water, 6.8 parts of sodium nitrite dissolved in 20 parts of water added and the mixture treated with 100 parts of crushed ice. With good stirring there are quickly added 30 parts of hydrochloric acid of 30 per cent strength, diluted with an equal volume of water. The whole is stirred for 15 minutes and care is taken by the addition of ice that the temperature does not exceed 3° C. To the red suspension of the diazo compound obtained there is now added with stirring and cooling a solution of 14 parts of 5-methyl-2-methoxy-1-aminobenzene in 600 parts of alcohol. Within 3 hours a solution of 20 parts of crystallized sodium acetate in 100 parts of water is added drop by drop and the whole then stirred for a further 12 hours at 10–15° C. The monoazo dyestuff precipitated as a red precipitate is now filtered with suction and washed with dilute sodium chloride solution. The filter cake is then suspended in 300 parts of water and treated with sodium carbonate to a neutral reaction whereby the whole passes into solution with a red-orange color. The solution is then cooled to 5–8° C. and within one hour 8.4 parts of diketene introduced drop by drop and the whole stirred for a further 6 hours at 5–10° C. In this operation the color of the solution turns to yellow-orange. After the odor of diketene has disappeared 25 parts of sodium carbonate and sufficient ice are added so that the temperature falls to 3° C. Then within 30 minutes a diazo solution is allowed to flow in, obtained by diazotization of 15.75 parts of 5-chloro-2-methoxy - 1 - aminobenzene in 200 parts of water. The whole is stirred for 2 hours at 0–5° C. and 12 hours at 10–15° C. and the precipitated dyestuff filtered with suction. After drying in vacuum at 40–50° C., there is obtained a dark powder which dissolves in water with a red color and when printed on cotton after development with acid oxidizing agents gives powerful brown orange shades of good fastness properties.

The new dyestuff corresponds in constitution to the fromula

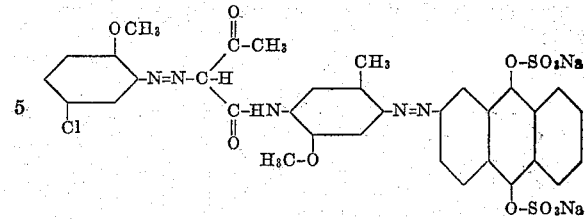

Example 9

28.7 parts of the amino azo dyestuff of the formula

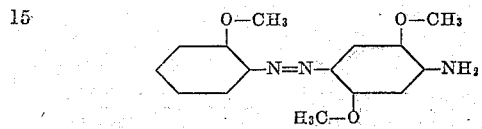

are diazotized with 25 parts of 30 per cent. hydrochloric acid and 6.9 parts of sodium nitrite in 300 parts of water at 5–7° C. The yellow-brown diazo solution is allowed to flow with stirring at 5–10° C. into a solution of 54.7 parts of the disodium salt of the leuco sulfuric acid ester of 3-chloro - 2 - acetoacetylamino - anthraquinone and 30 parts of sodium carbonate in 500 parts of water. The whole is stirred for 4 hours at 5–8° C. and 12 hours at room temperature. Heating is then carried out to 40–45° C., 50 parts of sodium chloride added and the whole stirred until the dyestuff has completely separated. This is filtered, washed with dilute sodium chloride solution and dried in vacuum at 50–60° C. The dyestuff is obtained in the form of a dark powder which dissolves in water with orange color and when printed on cotton after development with acid oxidizing agents yields powerful red-orange shades of good fastness properties.

The new dyestuff corresponds to the formula

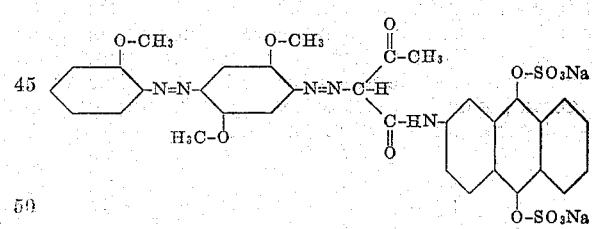

Example 10

54.7 parts of the disodium salt of the leuco sulfuric acid ester of 3-chloro-2-acetoacetylaminoanthraquinone are dissolved in 500 parts of water with 25 parts of sodium carbonate. Into the sodium, cooled to 5° C., is allowed to flow with good stirring within 30 minutes a diazo solution from 14.3 parts of 1-aminonaphthalene in 250 parts of water. The whole is stirred for 3 hours at 5–10° C. and 6 hours at 10–15° C. Heating is then carried out to 45–50° C. whereby the dyestuff which has in part separated passes into solution, 50 parts of sodium chloride stirred in and stirring continued at room temperature until the precipitation of the dyestuff is complete. This is filtered off, washed with dilute sodium chloride solution and dried in vacuum at 60–70° C. The dyestuff is obtained in the form of an orange-colored powder which is easily soluble in water with yellow-orange color and which when printed on cotton after development with acid oxidizing agents gives gold-yellow shades of very good fastness properties.

The dyestuff obtained corresponds to the formula

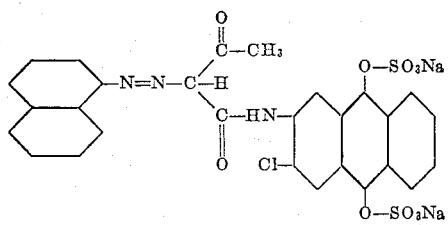

A dyestuff with similar properties is obtained when in the above example the 1-amino-naphthalene is replaced by 2-aminonaphthalene.

*Example 11*

56.5 parts of the dipotassium salt of the leuco sulfuric acid ester of the following constitution

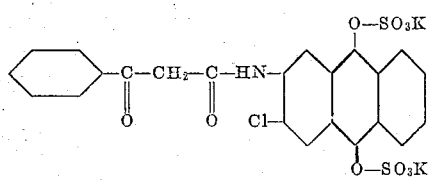

are dissolved in 500 parts of water with 30 parts of sodium carbonate and to the solution cooled to 0–5° C. a diazo solution added with stirring, obtained by diazotization of 18.7 parts of 4-chloro-1-amino-2:5-dimethoxybenzene in 300 parts of water. The whole is stirred for 2 hours at 0–5° C. and 10 hours at 8–12° C. The dyestuff for the most part separates. Heating is effected to 45–50° C. until a clear solution is obtained, 50 parts of sodium chloride added and the whole stirred at room temperature until all the dyestuff is precipitated. It is then filtered and washed with dilute sodium chloride solution. After drying in vacuum at 60–70° C., there is obtained a yellow brown powder which dissolves in water with a yellow color and when printed on cotton after development with acid oxidizing agents yields fast yellow shades. The new dyestuff corresponds to the formula

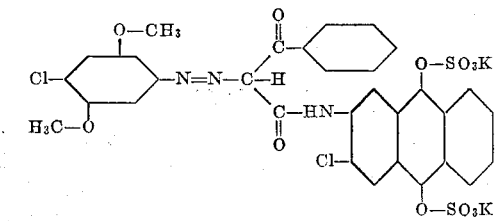

The compound of the formula given employed as coupling component in the above example, can be prepared in the following manner:

54.4 parts of the dipotassium salt of 2-acetoacetylamino-3-chloroanthraquinone leuco sulfuric acid ester are dissolved in 400 parts of water and 18.5 parts of 30 per cent. sodium hydroxide solution added. At 0–5° C. with good stirring 17 parts of benzoyl chloride are added drop by drop within one hour. The solution becomes intensely yellow colored. Stirring at 0–5° C. is continued for a further 4 hours and then sufficient acetic acid is added until blue litmus paper is just turned red whereupon ¼ of the volume of 20 per cent. ammonia solution is added. The whole is heated to 40° C. and the temperature maintained for one hour. Then the clear solution is evaporated in vacuum at 50–60° C. until crystallization commences, allowed to cool and the product filtered and dried in vacuum at 60° C. The dipotassium salt of the 2 - benzoylacetylamino - 3 - chloroanthraquinone leuco sulfuric acid ester obtained forms a white salt which is easily soluble in water.

*Example 12*

60.5 parts of the disodium salt of the leuco sulfuric acid ester of the following constitution

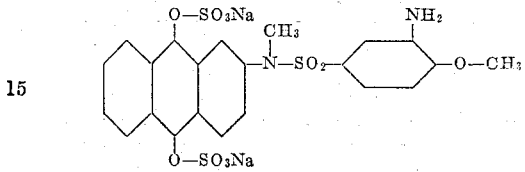

(obtained by condensation of β-aminoanthraquinone with 4-methoxy-3-acetyl-aminobenzene-1-sulfochloride, methylation of the sulfonamide obtained, esterification of the condensation product with chlorosulfonic acid in pyridine in the presence of iron and saponification of the acetyl amino group with dilute potassium hydroxide solution) are dissolved in 300 parts of water. The solution is cooled to 5° C. and with stirring within one hour 8.40 parts of diketene added drop by drop. The whole is stirred at 5–10° C. until the odor of diketene has disappeared, 30 parts of sodium carbonate then added and with cooling to 5–8° C. within 30 minutes a diazo solution introduced obtained by diazotization of 18.7 parts of 4-chloro-1-amino-2:5-dimethoxybenzene in 300 parts of water. Stirring is effected for 2 hours at 5–8° C. and 12 hours at 10–15° C., then 40 parts of sodium chloride are added and the precipitated dyestuff filtered off. After drying in vacuum at 50–60° C., there is obtained a brown dyestuff powder which dissolves in water with an orange color and when printed on cotton after development with acid oxidizing agents gives gold-orange shades of good fastness properties.

*Example 13*

42.9 parts of the disodium salt of the leuco sulfuric acid ester of 2-aminoanthraquinone are dissolved in 250 parts of water and the solution if necessary neutralized with a few drops of dilute acetic acid. To this solution are added drop by drop at 15–20° C. with good stirring 8.5 parts of diketene and stirring effected for 2 hours at 20° C. The whole is then treated with 25 parts of sodium carbonate and sufficient ice to cause the temperature to fall to 0° C. and with stirring within 30 minutes a diazo solution allowed to flow in containing 16.8 parts of 2-nitro-4-methoxy aniline in the form of diazo compound. Stirring is carried out for 2 hours at 0–5° C. and 6 hours at 10–15° C., 20 parts of sodium chloride are added and the precipitated dyestuff filtered off. After drying in vacuum at 40–50° C., a brown red powder is obtained which easily dissolves in water with a red color. When printed on cotton and developed with sodium nitrite and dilute sulfuric acid pure orange shades are obtained of good fastness to boiling and chlorine.

*Example 14*

46.35 parts of the disodium salt of the leuco sulfuric acid ester of 3-chloro-2-aminoanthraquinone are dissolved in 200 parts of water, the solution exactly neutralized with dilute acetic acid and with stirring at 10–15° C., 8.5 parts of diketene added drop by drop. In this operation the temperature rises to 18–20° C. Stirring is carried out at 20° C. for 2 hours after which time no more free aminoanthraquinone can be detected. 25 parts of sodium carbonate are now added to the solution and sufficient ice to cause the temperature to fall to 0° C. and within 30 minutes a diazo solution is allowed to flow in obtained by diazotization of 17.25 parts of 4-chloro-2-nitraniline in 200 parts of water. After a short time the dyestuff commences to deposit as an orange-red colored precipitate. Stirring is carried out for 2 hours at 0–5° C. and 6 hours at 10–15° C. Then 20 parts of sodium chloride are added for complete separation of the dyestuff, stirring is continued for one hour and the product is filtered. After drying in vacuum at 40–50° C., a red-orange colored powder is obtained which is very easily soluble in water with orange color. When printed on cotton there are obtained after development with sodium nitrite and dilute sulfuric acid pure yellow shades of outstanding fastness of boiling and chlorine.

*Example 15*

46.35 parts of the disodium salt of the leuco sulfuric acid ester of 3-chloro-2-aminoanthraquinone are dissolved to a neutral solution in 200 parts of water and into the solution at 10–15° C. with good stirring 8.5 parts of diketene introduced drop by drop. The mixture is stirred for 2 hours at 20° C. and then 25 parts of sodium carbonate added and sufficient ice to cause the temperature to fall to 0° C. and within 30 minutes a diazo solution is allowed to flow in obtained by diazotization of 15.7 parts of 5-chloro-2-methoxy-aniline in 200 parts of water. Stirring is carried out for 2 hours at 0–5° C. and 6 hours at 10–15° C. Then the solution is treated with 20 parts of sodium chloride, stirred until the dyestuff is completely separated and filtered. After drying in vacuum at 40–50° C., a red powder is obtained which is easily soluble in water with red-orange color. When printed on cotton there are obtained after development with sodium nitrite and dilute sulfuric acid pure reddish yellow shades of good fastness to boiling and chlorine.

*Example 16*

46.35 parts of the disodium salt of the leuco sulfuric acid ester of 3-chloro-2-aminoanthraquinone are dissolved in 200 parts of water, 6.8 parts of sodium nitrite dissolved in 20 parts of water added and the mixture treated with 100 parts of crushed ice. With good stirring there are added in one operation 30 parts of concentrated hydrochloric acid. Stirring is carried out for 15 minutes and care is taken by addition of ice that the temperature does not exceed 0–3° C. Into the red suspension of the diazo compound obtained there is then allowed to flow with stirring and cooling a solution of 14 parts of 5-methyl-2-methoxy-1-aminobenzene in 100 parts of alcohol. Within 3 hours a solution of 20 parts of crystallized sodium acetate in 100 parts of water is added drop by drop and stirring then continued for 12 hours at 10–15° C. The monoazo dyestuff separated as a red precipitate is then filtered with suction and washed with dilute sodium chloride solution. The filter cake is then suspended in 300 parts of water, sodium carbonate added to a neutral reaction and in this manner the whole brought into solution with a red color. Then at 10–15° C., 8.4 parts of diketene are added drop by drop and stirring carried out for 3 hours at 20° C. In this operation the color for the solution changes from red to orange. After the odor of diketene has disappeared, 25 parts of sodium carbonate are added and sufficient ice to cause the temperature to fall to 0° C. Then within 30 minutes a diazo solution is allowed to flow in, obtained by diazotization of 17.25 parts of 4-chloro-2-nitraniline in 200 parts of water. Stirring is carried out for 2 hours at 0–5° C. and 12 hours at 10–15° C. The dyestuff separates as a brown precipitate. After filtration with suction and drying in vacuum at 40–50° C., a dark powder is obtained which dissolves in water with a red violet color and when printed on cotton after development with sodium nitrite and dilute sulfuric acid gives powerful red-brown shades of good fastness properties.

*Example 17*

A printing paste is prepared from:

60 parts of the dyestuff obtained according to Example 14,
50 parts of thiodiethylene glycol,
50 parts of stiffener,
220 parts of water,
550 parts of starch tragacanth thickening,
50 parts of 30 per cent. sodium nitrite solution,
20 parts of 10 percent sodium carbonate solution 1000 parts After printing steaming is carried out for 5 minutes in the Mather-Platt and subsequently development effected on the foulard in a bath containing 20 parts of sulfuric acid of 95 per cent. strength in 1000 parts of water at 70° C. for at least 10 seconds. After squeezing out the material has a passage through the air of 20–30 seconds and is then rinsed and then soaped for 10 minutes at the boil, rinsed again and dried. There are obtained in this manner powerful prints of pure greenish yellow shades.

What we claim is:

1. An azo dyestuff of the formula

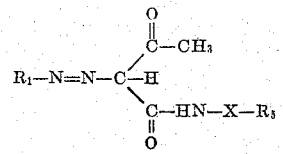

in which $R_1$ stands for the radical of a diazo component of the benzene series free from solubilizing groups, $R_5$ stands for a radical of a leuco sulfuric acid ester of an anthraquinone attached in β-position of the antraquinone nucleus directly to X, and X stands for a member selected from the group consisting of a direct linking bond and of the radicals $-R_7-NH-CO$, $R_7-CO-NH-$ and

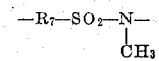

in which radicals $R_7$ stands for a benzene radical.

2. An azo dyestuff of the formula

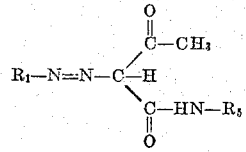

in which $R_1$ stands for the radical of a diazo component of the benzene series free from solubilizing groups and $R_5$ stands for a radical of a leuco sulfuric acid ester of an anthraquinone attached in β-position of the anthraquinone nucleus directly to the —HN— group.

3. An azo dyestuff of the formula

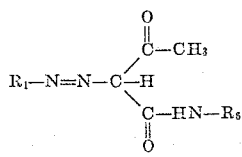

in which $R_1$ stands for radical of a diazo component of the benzene series free from solubilizing groups and $R_6$ stands for a leuco sulfuric acid ester of the radical

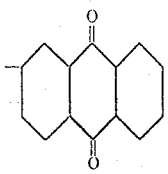

4. An azo dyestuff of the formula

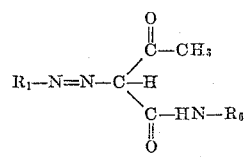

in which $R_1$ stands for the radical of a diazo component of the benzene series free from solubilizing groups and $R_6$ stands for a leuco sulfuric acid ester of the radical

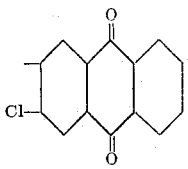

5. A leuco sulfuric acid ester of the azo dyestuff of the formula

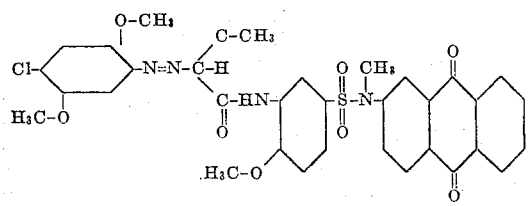

6. A leuco sulfuric acid ester of the azo dyestuff of the formula

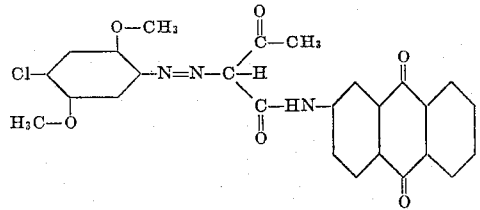

7. A leuco sulfuric acid ester of the azo dyestuff of the formula

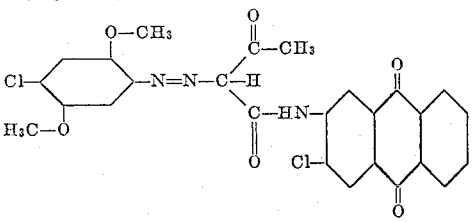

8. A leuco sulfuric acid ester of the azo dyestuff of the formula

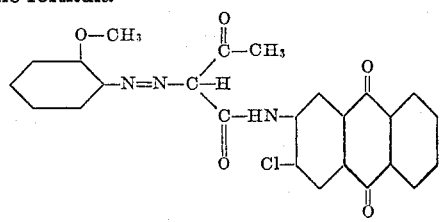

9. A leuco sulfuric acid ester of the azo dyestuff of the formula

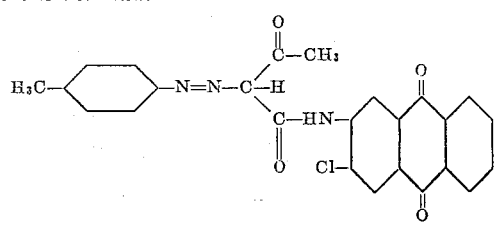

WILLY MUELLER.
MAX SCHMID.

REFERENCES CITED

The following references are of record in the file of this patent:

UNITED STATES PATENTS

| Number | Name | Date |
|---|---|---|
| 2,108,602 | Mannes et al. | Feb. 15, 1938 |
| 2,117,772 | Stallman | May 17, 1938 |
| 2,292,306 | Vittum et al. | Aug. 4, 1942 |
| 2,347,027 | Besler | Apr. 18, 1944 |

FOREIGN PATENTS

| Number | Country | Date |
|---|---|---|
| 542,213 | Great Britain | Dec. 31, 1941 |